United States Patent
Chen et al.

(10) Patent No.: US 9,919,940 B2
(45) Date of Patent: Mar. 20, 2018

(54) SULPHUR CYCLE-ASSOCIATED DENITRIFYING ENHANCED BIOLOGICAL PHOSPHORUS REMOVAL (SD-EBPR) UTILIZING SULPHUR COMPOUNDS AS ELECTRON CARRIERS FOR BIOLOGICAL NUTRIENT REMOVAL OF WASTEWATER TREATMENT

(71) Applicant: THE HONG KONG UNIVERSITY OF SCIENCE AND TECHNOLOGY, Hong Kong (CN)

(72) Inventors: Guanghao Chen, Hong Kong (CN); Di Wu, Hong Kong (CN); Ho Kwong Chui, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 15/034,663

(22) PCT Filed: Nov. 13, 2014

(86) PCT No.: PCT/CN2014/090970
§ 371 (c)(1),
(2) Date: May 5, 2016

(87) PCT Pub. No.: WO2015/070770
PCT Pub. Date: May 21, 2015

(65) Prior Publication Data
US 2016/0251247 A1    Sep. 1, 2016

Related U.S. Application Data

(60) Provisional application No. 61/962,634, filed on Nov. 13, 2013.

(51) Int. Cl.
C02F 3/30     (2006.01)
C02F 3/34     (2006.01)
C02F 103/08   (2006.01)

(52) U.S. Cl.
CPC ............ C02F 3/308 (2013.01); C02F 3/345 (2013.01); C02F 2103/08 (2013.01)

(58) Field of Classification Search
CPC ....... C02F 3/308; C02F 3/345; C02F 2103/08
(Continued)

(56) References Cited

U.S. PATENT DOCUMENTS 6,344,143 B1 * 2/2002 Ahn ................... C02F 3/1221
                                                          210/620
8,192,626 B2 * 6/2012 Theodore ............... A01G 33/00
                                                          210/620
(Continued)

FOREIGN PATENT DOCUMENTS

CN      1671630 A   *  9/2005
CN    101585651 A   * 11/2009
(Continued)

OTHER PUBLICATIONS

Wang, Yayi et al. "Characteristics and Affecting Factors of Denitrifying Phosphorus Removal in Two-Sludge Sequencing Batch Reactor" Environmental Science, vol. No. 6, No. vol. 29, Jun. 19, 2008 (Jun. 15, 2008), ISSN: pp. 1526-1532.*
(Continued)

*Primary Examiner* — Freddie G Prince, Jr.
(74) *Attorney, Agent, or Firm* — Nath, Goldberg & Meyer; Jerald L. Meyer; Stanley N. Protigal

(57) ABSTRACT

Sewage treatment is performed by using Sulphur to facilitate electron flow. A first cycle uses a sulphur composition having sulphur and/or sulphur compounds to transfer electrons from organic carbon to oxygen, nitrate and nitrite, and
(Continued)

to convert phosphorus-containing compounds to solid material, which is retained in sewage sludge. The sulphur is further used to perform denitrification of nitrogen compounds. A further cycle uses oxygen to oxidize any ammonia present to nitrate and/or nitrite.

2 Claims, 5 Drawing Sheets

(58) Field of Classification Search
USPC ....... 210/605, 621, 622, 623, 631, 252, 259, 210/903, 906
See application file for complete search history.

(56) References Cited

U.S. PATENT DOCUMENTS

| | | | |
|---|---|---|---|
| 2005/0252854 A1* | 11/2005 | Krier | C02F 3/06 210/605 |
| 2006/0000768 A1* | 1/2006 | Miklos | C02F 3/006 210/605 |
| 2007/0108125 A1* | 5/2007 | Cho | C02F 3/1273 210/605 |
| 2012/0217202 A1* | 8/2012 | Theodore | C02F 3/302 210/611 |
| 2013/0256223 A1* | 10/2013 | Chen | C02F 3/302 210/620 |

FOREIGN PATENT DOCUMENTS

| | | | |
|---|---|---|---|
| CN | 101734792 A | * | 6/2010 |
| WO | WO 2012071793 A1 | * | 6/2012 |

OTHER PUBLICATIONS

Jiang, Shanquan et al. "Three-stage SBR Treatment Process for Phosphorus and Nitrogen Removal of Domestic Wastewater" Journal of Chongquing University (Natural Science Edition), vol. No. 3, No. vol. 30, Mar. 30, 2007 (Mar. 30, 2007), ISSN: pp. 125-127 and 132.*

* cited by examiner

SULPHUR CYCLE-ASSOCIATED DENITRIFYING ENHANCED BIOLOGICAL PHOSPHORUS REMOVAL (SD-EBPR) UTILIZING SULPHUR COMPOUNDS AS ELECTRON CARRIERS FOR BIOLOGICAL NUTRIENT REMOVAL OF WASTEWATER TREATMENT

This is a National Phase Application filed under 35 U.S.C. 371 as a national stage of PCT/CN2014/090970, filed Nov. 13, 2014, an application claiming the benefit of U.S. Provisional Application No. 61/962,634, filed Nov. 13, 2013, the content of each of which is hereby incorporated by reference in its entirety.

BACKGROUND

Field

This disclosure relates to treatment of wastewaters containing organic matter, phosphorus and nitrogen. In particular, the disclosure relates to utilizing sulphur compounds as the electron carrier for biological nutrient removal of wastewater treatment Background Since the discovery of activated sludge process and the introduction of the biological nutrient removal processes, the biological Phosphorus (P), Nitrogen (N) and Carbon (C) removal processes has remained the same, i.e., with electron flow from carbon to oxygen through heterotrophic carbon oxidation, as shown in FIG. 1.

The details of this biological P, N and C removal process are as follows:

Reactor 1: P is released and organic carbon is taken up and stored as poly-hydroxyalkanoates (PHAs) by the Polyphosphate Accumulating Organisms (PAOs) when no oxygen or nitrate is present.

Reactor 2: When nitrate is present, the stored organic carbon is oxidized to $CO_2$ through heterotrophic denitrification. Nitrate is reduced to $N_2$. Electron flows from organic carbon to nitrate with simultaneous P-uptake by the PAOs.

Reactor 3: Electron flows from ammonia to oxygen with nitrate formed through autotrophic nitrification which is recycled back to Reactor 2.

If nitrogen removal is not necessary, the biological processes can be simplified as FIG. 2. The biological processes are as follows:

Reactor 1: P is released and organic carbon is taken up and stored as PHAs by the PAOs when no oxygen is present.

Reactor 2: When oxygen is present, the stored organic carbon is oxidized to $CO_2$ through heterotrophic carbon oxidation. Electron flows from organic carbon to oxygen with simultaneous P-uptake by the PAOs.

As the heterotrophic carbon oxidation and heterotrophic denitrification process has a very high sludge yield factor, depending on the sludge age, about 40-50% of the organic carbon in the sewage will be converted to $CO_2$ while the rest converted to sewage sludge. The disposal of excess sludge, which often involves sludge digestion, dewatering and incineration, is not only costly, but also unwelcome by neighbours to the facility.

Since the introduction of biological phosphorus (P) removal process in 1970s, the process has relied on the electron flow from organic carbon to oxygen via an integrated P-uptake and release cycle. As the process has a high sludge yield, excess sludge disposal is required.

Sulphate Reduction Autotrophic Denitrification and Nitrification Integrated SANI Process Making use of the sulphate ion available in the saline sewage of Hong Kong, where seawater is used for toilet flushing, the Hong Kong University of Science and Technology developed the novel Sulphate reduction Autotrophic denitrification and Nitrification Integrated (SANI) process (Lau et al., 2006; Lu et al., 2009; Wang et al., 2009) as shown in FIG. 3. In the SANI process, sulphate originating from seawater is used to oxidize organic carbon to $CO_2$ while sulphate is reduced to dissolved sulphide by the sulphate reduction bacteria in the first reactor. On the other hand, nitrogen present in ammonia is oxidized by oxygen to nitrate in the third reactor by the autotrophic nitrifiers. The nitrate formed is then recycled to the second reactor to react with the sulphide ion to convert into nitrogen gas by the autotrophic denitrifiers while sulphide will be converted back to sulphate ion. An example of the SANI process is described in PCT/CN2011/002019 filed 2 Dec. 2011, published as WO 2012/071793 A1, and as correspond application US2013/0256223.

Each liter of seawater contains about 2.7 grams of sulphate. When used with a seawater flushing system, the sulphates in seawater can be used to oxidize the organic carbon pollutants forming sulphide; while the sulphide formed can then be used to reduce nitrate to nitrogen gas through autotrophic denitrification, which can help sludge reduction. The SANI process uses sulphate-reducing bacteria to oxide and eliminate pollutants in the seawater-mixed sludge. It is noted, however, that the sulphate cannot directly reduce sludge; however, it is used as a oxidizing and reducing agent to remove organic carbon and nitrate, which in turn results in sludge reduction.

The three key biological chemical processes all produce minimal sludge as shown in the following equations:

(1) Heterotrophic Sulphate Reduction:

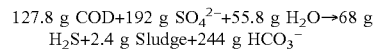

(2) Sulfide Sulphide Oxidation and Autotrophic Denitrification:

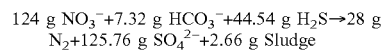

(3) Autotrophic Nitrification:

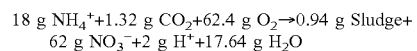

Limited-Oxygen Sulphur Cycle-Associated EBPR (LOS-EBPR) Process

In view of its significant environmental and financial benefits to minimize sludge production by the SANI process, research has been conducted to extend the SANI process for P-removal. The success of this biological P-removal SANI process lies with the development of the P uptake and release in the sulphur cycle. Although the oxygen and nitrate induced P-uptake and release phenomenon has been fully studied and understood, the proposed sulphur cycle involved P-uptake and release has not been extensively tested. The phenomenon is described in Sulphate Reducing Bacteria (SRB) with the PAOs.

SUMMARY

Sewage treatment is performed using a first cycle which uses sulphur comprising at least one of sulphur and sulphur compounds to transfer electrons from organic carbon to oxygen, nitrate and nitrite. The sulphur is also used to convert phosphorus containing compounds to solid material for retention in sewage sludge. The sulphur is then used to perform denitrification of nitrogen compounds. Oxygen is used to oxidize any ammonia present to nitrate and/or nitrite.

DETAILED DESCRIPTION

Overview

Figure 4:
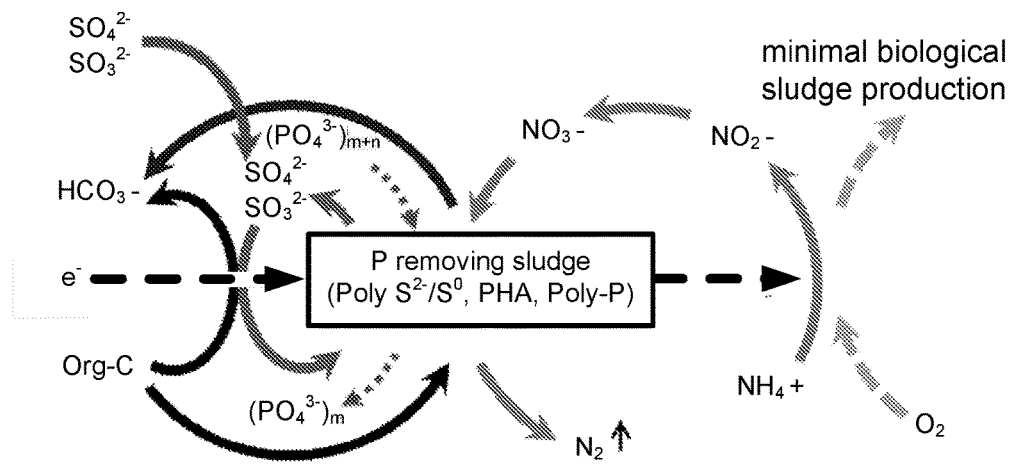
FIG. 4 is a schematic diagram showing an example of sulphur cycle-associated denitrifying enhanced biological phosphorus removal (SD-EBPR) process for biological nutrient removal.

By introducing the sulphur cycle into the carbon oxidation cycle, a Sulphur cycle-associated Denitrifying Enhanced Biological Phosphorus Removal (SD-EBPR) process is developed for biological nutrient removal (BNR) with minimal sludge production. FIG. 4 is a schematic diagram showing an example of the SD-EBPR technique for C, N and P removal. Sulphur compounds in various forms, such as sulphate ($SO_4^{2-}$), sulphite ($SO_3^{2-}$), thiosulphate ($S_2O_3^{2-}$), sulphide ($S^{2-}$) and elemental sulphur)($S^0$) (the key forms of sulphur present in wastewater) can be used as electron carrier to transfer electrons from organic carbon to oxygen through luxury P-uptake and release, anaerobic carbon uptake (PHAs storage), heterotrophic sulphur reduction (poly-$S^2$/$S^0$ storage), and heterotrophic/autotrophic denitrification and autotrophic nitrification, by the sulphur cycle based Poly-phosphate Accumulating Organisms (PAOs, as a new type of process using PAOs, which is not found in the conventional carbon based EBPR process. This process can be described as a sulphur cycle based PAO process, which differs from processes in other biological wastewater treatment plant processes using PAOs.

In terms of operation, the feed and the reaction of an aerobic sequencing batch reactor (SBR) can be combined into a single step. Moreover, to enable a more efficient operation, it is also possible to use a combination of several similar or identical biological P-removal reactors and nitrification reactors operating in parallel in order to smooth out the operations. Through the SD-EBPR process, it is possible to achieve biological nutrient removal from wastewater while at the same time minimizes sewage sludge production.

The sulphur can be derived from any convenient source. In non-limiting examples, saline sea water provides the sulphur. The saline water is either provided as part of the wastewater, for example as a saline water flush system, or is added to the wastewater during treatment. The salinity is not essential, and is only one way to provide the sulphate and/or sulphite. The sulphur can also be provided from industrial effluent such as flue gas desulphurization units.

Figure 5:
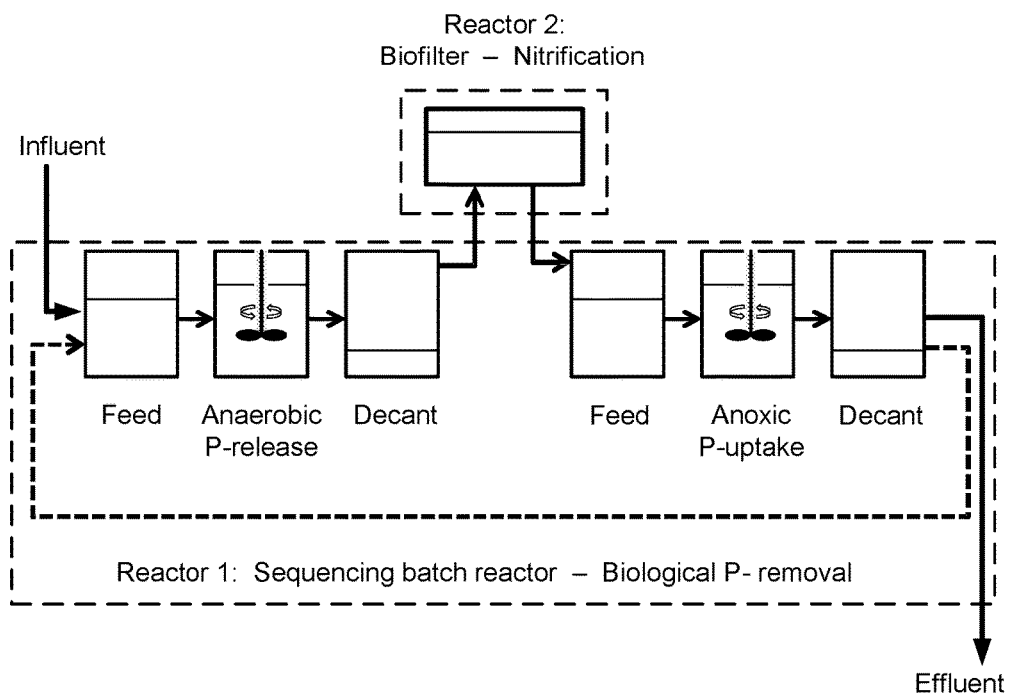
FIG. 5 is a schematic block diagram showing a conceptual design for the SD-EBPR Process.

The SD-EBPR process is shown in FIG. 5. In a test configuration, a biological P-removal reactor was integrated into the system using the SBR process (Reactor 1) and an attached growth nitrification reactor (Reactor 2) for SD EBPR, as shown in FIG. 5. The biological processes involved are summarized as follows:

Reactor 1—Primary Feeding: Wastewater is added to Reactor 1—the sulphur cycle SBR; where necessary, alternative sulphur source can be added at the same time.

Reactor 1—Anaerobic reaction: Poly-phosphate degradation and organic carbon uptake by microorganisms. Phosphate is released to the bulk liquid and PHAs is synthesized. Sulphur compound reduces to poly-$S^{2-}$/$S^0$ while part of the organic carbon oxidizes to $CO_2$ through heterotrophic sulphur reduction. Electron flows from organic carbon to the storage products (e.g., PHAs and poly-$S^{2-}$/$S_0$). A small amount of sulphide and thiosulphate is produced by anaerobic sulphate reduction.

Reactor 1—Primary Settling and Decantation: the supernatant of the reactor after anaerobic reaction is pumped into Reactor 2, an aerobic attached growth reactor.

Reactor 2—Nitrification: The organic nitrogen compounds and any ammonia which is present/produced are converted to nitrite ($NO_2^-$)/nitrate ($NO_3^-$) through autotrophic nitrification. Electron flows from organic nitrogen compounds and ammonia to oxygen with nitrite/nitrate formed.

Reactor 1—Secondary Feeding: Effluent from Reactor 2 is pumped back to Reactor 1.

Reactor 1—Anoxic Reaction: Electron flows from the storage products (e.g., PHAs and) poly-$S^{2-}$/$S^0$ to nitrite/nitrate. Poly-$S^2$/$S^0$ oxidizes to sulphate through autotrophic denitrification and PHAs oxidizes to $HCO_3^-$ through heterotrophic dentrification while nitrite/nitrate reduces to nitrogen gas. At the same time, luxury P uptake occurs.

Reactor 1—Secondary Settling and Decantation: Settling is conducted and the supernatant is decanted as final effluent.

The depiction of FIG. 5 shows at temporal change in status. Reactor 1 is a single reactor; however the depiction gives the appearance of multiple reactors because it represents a change of status in terms of time. In viewing FIG. 5, after feeding, the stirrer will start with P-release, and then decants. The effluent from Reactor 1 will then be pumped to Reactor 2. After that, the effluent from Reactor 2 can feed back to Reactor 1, the stirrer then starts with P-uptake, then decants as final effluent.

Under anoxic condition, there is nitrate ($NO_{3-}$) and nitrite ($NO_{2-}$). During the process bacteria will use up the oxygen from nitrate and convert the nitrate to nitrogen gas. In this phase, bacteria consume the phosphorus from the bulk liquid. This contrasts with anaerobic processed in that, under anaerobic conditions, there is no nitrate and nitrite, and instead bacteria will release phosphorus into the bulk liquid.

Figure 6:
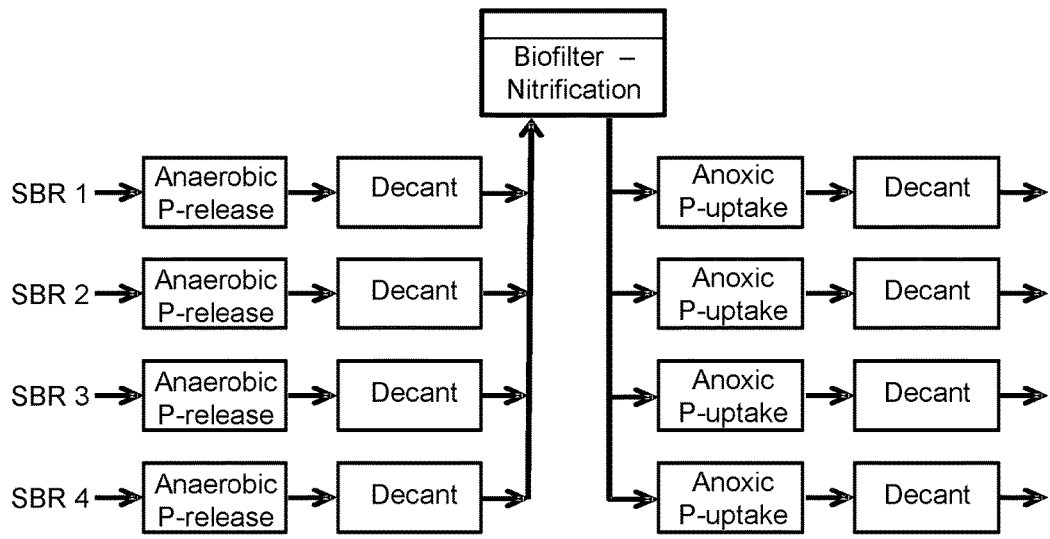
FIG. 6 is a schematic block diagram showing several sequencing batch reactors (SBR) operating in parallel to achieve a smooth operation of the SD-EBPR Process.

Depending on the design of the reactors, apart from activated sludge/SBR process, other types of reactor designs such as granular sludge bed, attached growth biofilters, membrane biological reactors, can be used for biological P-removal. Moreover, the SD-EBPR process can be operated in many forms, such as a combination of SBR in parallel operation to enable a continuous flow condition, as shown in FIG. 6.

The minimum sulphur content is related to the concentration of organic material in the wastewater. A minimum ratio between the organics and sulphur contents used to completely process the wastewater would be 2 g COD/1 g $SO_4$-S or 1.5 g COD/g $SO_3$-S, where COD is the Chemical Oxygen Demand. This ratio may change if other sulphur compounds, e.g. thiosulphate, is used. It is also possible that lower ratios can be used, such as at least 1.5 g COD/g $SO_4$-S, or 1 g COD/g $SO_3$-S by weight, depending on the characteristics of the wastewater being treated.

Using Other Sulphur Compounds

Figure 7:
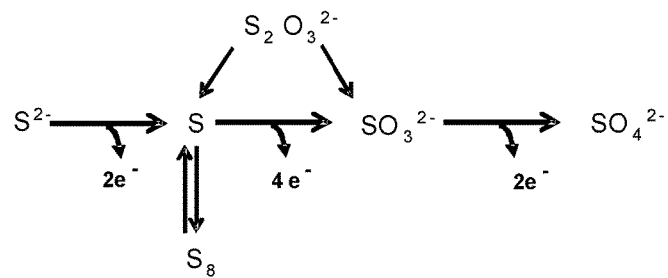
FIG. 7 is a diagram showing key biological reactions in the oxidation of sulphur compounds.

The SD-EBPR process, apart from sulphate, may make use of other possible sulphur oxidation and reduction processes for accomplishing the heterotrophic sulphur reduction and autotrophic sulphur oxidation processes. The key biological processes involved in the autotrophic oxidation of sulphur compounds are shown in FIG. 7. The reverse of these reactions, i.e., the reduction of the oxidized sulphur compounds, are conducted by the heterotrophic sulphur-reducing bacteria.

As compared to the conventional biological P-removal processes, the SD-EBPR process makes use of the sulphur compounds as electron carrier for the oxidation of organic carbon to carbon dioxide. As both the anaerobic sulphur-reduction and autotrophic sulphur-oxidation processes have very low sludge yield factor, the sludge production rate of the SD-EBPR process is much lower than conventional P-removal processes. It effectively minimizes the need for sludge wastage, handling and disposal requirements. This not only reduces a large amount of sewage treatment cost, but also reduces greenhouse gas emission.

Effectiveness of the SD-EBPR

Figure 1:
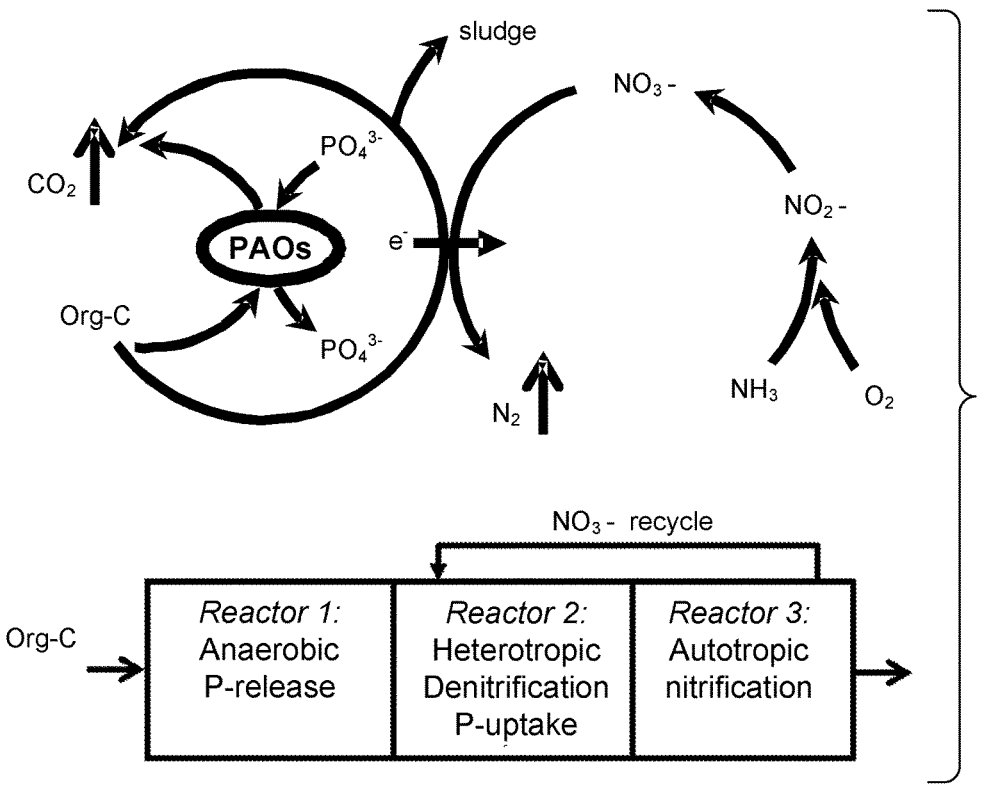
FIG. 1 is a schematic diagram showing an example of a conventional biological process of P, N and C removal.
Figure 2:
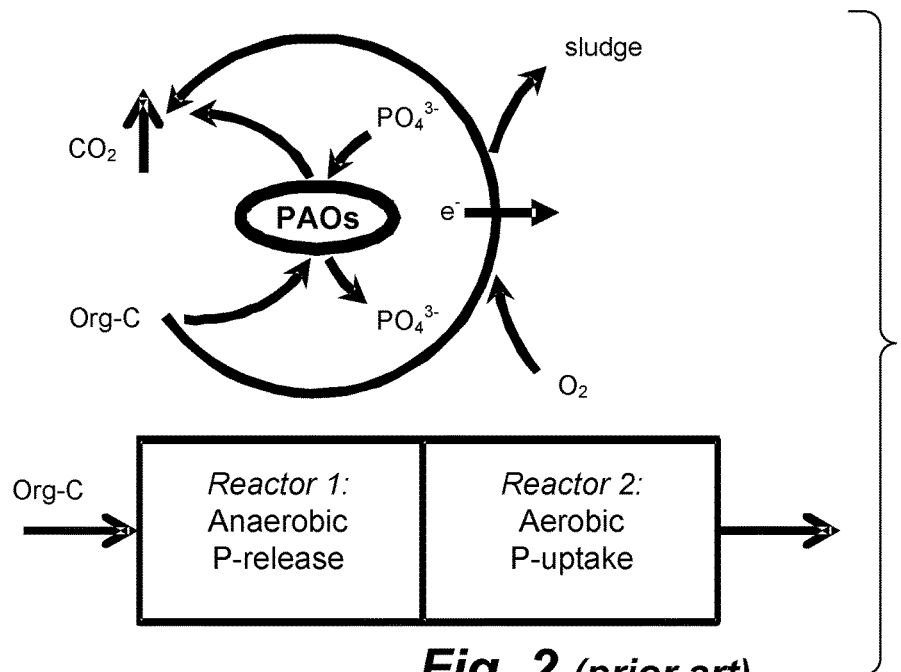
FIG. 2 is a schematic diagram showing an example of a conventional biological process of P and C removal.

As compared with conventional biological process, shown in FIG. 1, the SD-EBPR process shown in FIG. 5 introduces a sulphur cycle by making use of the sulphur compounds as the electron carrier for the oxidation of organic carbon to $CO_2$.

Figure 3:
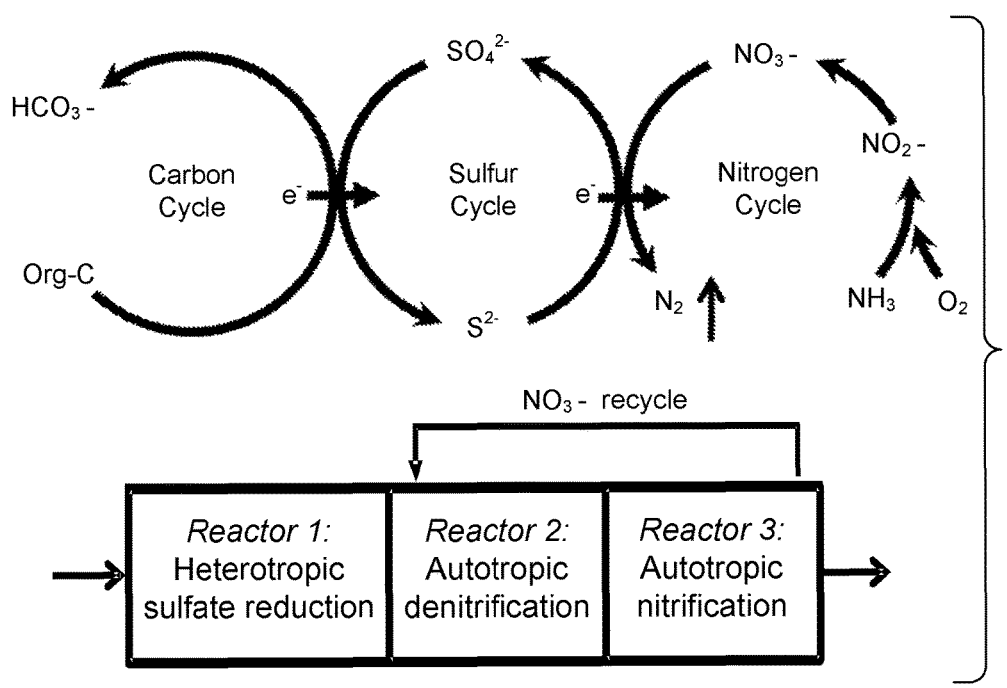
FIG. 3 is a schematic diagram showing an example of a biological process using the SANI technique for N and C removal.

As compared with the SANI process, shown in FIG. 3, the SD-EBPR process (FIGS. 4 and 5) introduces a sulphur induced Phosphorus-uptake and release phenomenon to accomplish biological phosphorus removal, in addition to carbon and nitrogen removal.

Example—SD-EBPR Process

Figure 8:
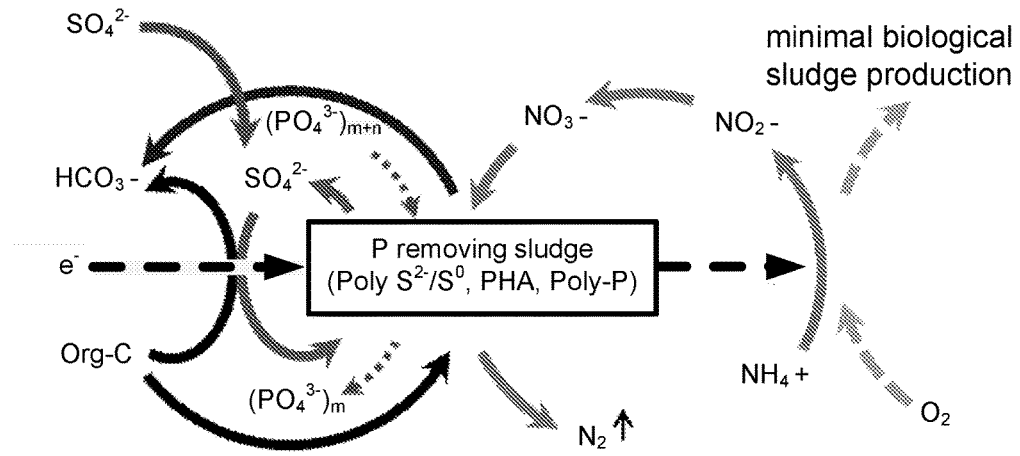
FIG. 8 is a diagram showing the SD EBPR process with a sulphate cycle used in a lab study.

A 140-day lab-scale study was completed using synthetic sewage, confirming that the SD-EBPR system, as shown in FIG. 8, operates satisfactorily with simultaneous removal of COD, N and P, and with minimized biological sludge production. The configuration was the same as depicted in FIG. 4, except that, since sulphate ($SO_4^{2-}$) was used in the lab study, sulphate, the process differs from that depicted in FIG. 4 in that the processing of sulphite ($SO_3^{2-}$) is absent.

Set Up of the SD-EBPR Lab-Scale System

Figure 9:
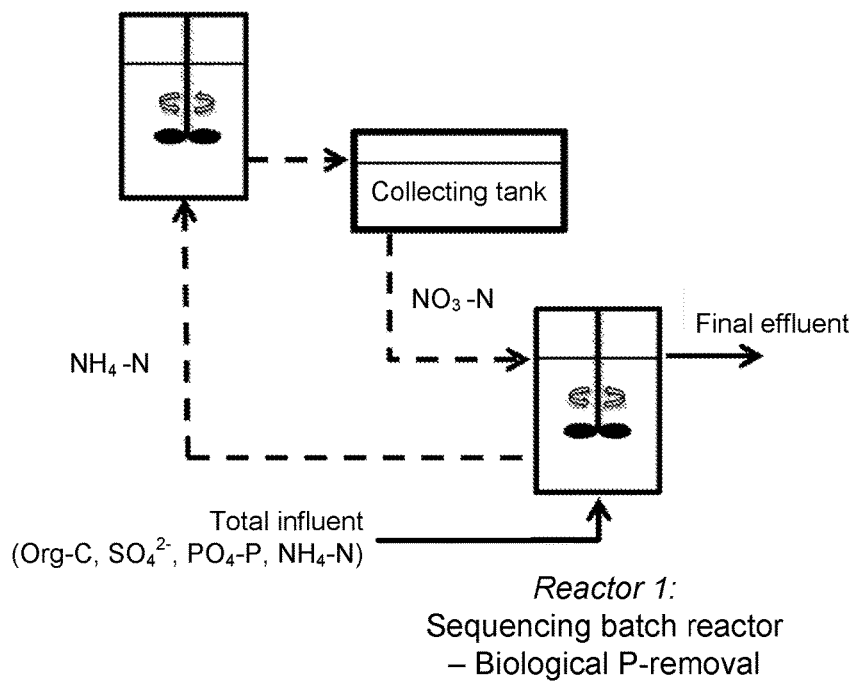
FIG. 9 is a diagram showing the SD-EBPR process in which synthetic sewage is employed in a lab-scale system.

FIG. 9 is a diagram showing the SD-EBPR process in which synthetic sewage is employed in a lab-scale system. The SD-EBPR lab-scale system was installed in an environment in which synthetic sewage was employed. Comprising of a sequencing batch reactor (Reactor 1) for sulphur cycle enhanced biological removal, and a sequencing batch reactor (Reactor 2) for autotrophic nitrification. The lab-scale system had been operated at stable conditions for about 100 days.

Reactor 1 was made of transparent PVC, having a total reactor volume of 5 L (4 L reaction volume and 1 L headspace). This reactor was tightly sealed and continuously operated in darkness, with mixing by a mechanical mixer, at 250 rpm. Reactor 2, packed with plastic media (specific area of 200 $m^2/m^3$), had an effective liquid volume of 4 L. In addition, a 3.5 L tank was used to collect the nitrified effluent from Reactor 2, and then pumped into Reactor 1 at the initial of anoxic reaction phase.

Reactor 1 was operated continuously under an alternating anaerobic/anoxic condition. The cycle length of this SBR (Reactor 1) was 720 min in total. The cyclic operation of this anaerobic anoxic-SBR, comprised (i) feeding of 2 L synthetic sewage (in 10 min), (ii) anaerobic reaction phase (in 310 min), (iii) setting (30 min), (iv) decanting 3.5 L of liquid (i.e., primary discharge) into Reactor 2 (in 10 min), (v) feeding of 3.5 L nitrified effluent from the collecting tank into Reactor 1 (in 10 min), (vi) anoxic reaction phase (in 230 min), (vii) settling (in 110 min), and (viii) decanting 2 L of supernatant as the final effluent (in 10 min).

Reactor 2 was intermittently operated in every 12 hours. In each operation, the cycle length of this SBR (Reactor 2) was 6 hours in total. The cyclic operation of Reactor 2 comprised (i) feeding 3.5 L of partially treated effluent from Reactor 1 into Reactor 2 (in 10 min), (ii) aerobic condition for autotrophic nitrification (in 310 min), (iii) settling (in 30 min), and (iv) decanting 3.5 L supernatant into the collecting tank (in 10 min).

After the nitrified effluent of Reactor 2 was discharged into the collecting tank, Reactor 2 and collecting tank was put aside in the idling condition of 6 hours; the nitrified effluent in the collecting tank was used by step (v) of Reactor 1 after 6 hours.

Reactor 1 and Reactor 2 were seeded and inoculated, respectively, with anaerobic digester sludge (MLSS~8,000 mg/L) and recycle activated sludge (MLSS~4,000 mg/L) taken from a local secondary saline sewage treatment plant. The operating condition of the lab-scale system at stable condition after an acclimation period of about 40 days is shown in Table 1:

TABLE 1

Operating condition of the SD-EBPR lab-scale system at stable operating condition.

| | Operating Mode | Cycle No. (per day) | Cycle time (hours) | pH | ORP (mV) | DO (mg/L) | T (° C.) | Salinity | SRT$^a$ (d) |
|---|---|---|---|---|---|---|---|---|---|
| Reactor 1 | Continuous | 2 | 12 | 7.4 ± 0.5 | −150~−250 | 0.05 | 21 ± 1 | 0.7% | 75 |
| Reactor 2 | Intermittent | 2 | 6 | 7.0 ± 0.5 | +100~+300 | 2~4 | 21 ± 1 | 0.7% | 50 |

The system SRT values were estimated based on the effluent washed out solids.

Synthetic Sewage

Synthetic sewage composition was modified from a composition developed by Kuba, et al. (1993) in terms of organic carbon and phosphorus concentrations, which contained 400 mg COD/L, 20 mg P/L and 50 mg N/L. It was prepared from 0.521 g/L NaAc, 0.067 g/L $K_2HPO_4$ and 0.035 g/L $KH_2PO_4$. Appropriate amounts of nitrogen and macro minerals were added to the feed by adding 0.19 g/L $NH_4Cl$, and 0.01 g/L EDTA (Kuba et al., 1993), and 2.0 ml/L trace mineral solution. The only organic substrate was sodium acetate. The sulphur source was provided by using 20% of real toilet flushing seawater instead of distilled water in the synthetic sewage. Seawater naturally contains sufficient ions of $Mg^{2+}$, $K^+$ and $Ca^{2+}$ required for poly-P synthesis.

System Performance

When operating under the anaerobic condition, Reactor 1 performed anaerobic acetate uptake (maximum rate≈11 mg C/g VS S/h) and sulphate reduction (maximum rate≈4 mg S/g VS S/h), in concomitant with anaerobic P release (maximum rate≈6 mg P/g VS S/h). The PHA synthesized during anaerobic phase was 30±12 mg PHA-C per cycle, while the poly-$S^{2-}/S^0$ formed was 21±8 mg poly-$S^{2-}/S^0$-S per cycle. In the subsequent anoxic condition, Reactor 1 performed denitrification (maximum rate≈10 mg N/g VSS/h) and anoxic P uptake (maximum rate 11 mg P/g VS S/h). The stored PHA and poly-$S^215°$ were completely consumed during the anoxic reaction phase. In summary, Reactor 1 achieved the volumetric rates of anaerobic acetate uptake, anaerobic sulphate reduction and anoxic nitrate consumption at 115±5.5 mg C/L/d, 48±6.9 mg S/L/d and 90 mg N/L/d, respectively. Meanwhile, the volumetric P removal rate from the bulk liquid in Reactor 1 was 7.2±3.2 mgP/L/d.

In Reactor 2, most ammonia was oxidized to nitrate, with an effluent nitrate concentration of 45 mg $NO_3$—N/L. All of effluent nitrate was used for denitrification and anoxic P-uptake in the anoxic reaction phase of Reactor 1.

Over all, this new bioprocess has been operated for simultaneous removal of organics, nitrogen and phosphorus, exhibiting excellent performance with COD=100%, N removal >90%, and P removal >85%. The final effluent total COD, total nitrogen (TN) and total phosphorus (TP) of Reactor 1 was about 40~60 mg COD/L, 0~5 mg TN-N/L, and 0~3 mg TP-P/L.

Comparing with conventional heterotrophic bacteria, both the sulphur cycle-associated bacteria and autotrophic bacteria produced much less sludge. The average MLVSS in Reactor 1 was about 3±0.5 g VSS/L. The observed yield coefficient of Reactor 1 was 0.05±0.02 g VSS/g COD. This confirmed that nearly no biological excess sludge removal from Reactor 1 was required. The settling capacity of the sludge in Reactor 1 was good, the $SVI_{30}$ of this sludge was 48±5 ml/g, since a large amount of inorganic poly-P had been accumulated in the sludge and the MLVSS/MLSS ratio was as low as 0.6~0.75 g VSS/g SS. The final effluent TSS was <40 mg SS/L.

Energy consumption and $CO_2$ emission from a treatment plant were mainly contributed from two sources: operation and sludge disposal. As there was no excess sludge removal required, we estimated that the SD-EBPR process could reduce one-third of energy consumption and greenhouse gas emission as compared with conventional biological nutrient removal process.

CONCLUSION

It is noted that, while influent and effluent is described, it is possible to pre-treat the sewage, which is likely in some areas where intermediate settling plants are used, and to post-treat the sewage, for example to reduce bacteria levels. Therefore, "influent" and "effluent" may be intermediate connections rather than the initial inflow of sewage or the final discharge of treated waste. Additionally, further processes can be included within the system within the scope of the technique.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A system for sewage treatment comprising:
    a first reactor comprising at least a first vessel providing anaerobic agitation receiving influent sewage waste and releasing phosphorus compounds from the sludge and a sulphur composition comprising at least one of sulphur and sulphur compounds;
    a second reactor, receiving an output from the first vessel providing an aerobic agitation and providing nitrification;
    the first reactor receiving an outflow from the second reactor, providing anoxic agitation and providing uptake of phosphorus compounds by the sludge, the sulphur composition in the first reactor providing an electron carrier for organic carbon to transfer electrons from the organic carbon to oxygen, nitrate and nitrite, the first reactor using the sulphur composition to induce phosphorus uptake and release to accomplish biological phosphorus removal, and thereby convert phosphorus containing compounds to solid material for retention in sewage sludge and perform denitrification of nitrogen compounds; and
    the first reactor further operating as a stage for decanting and discharge of final effluent,
    wherein the first reactor operates in a cycle of feeding wastewater, followed by an anaerobic reaction phase, followed by decanting liquid into the second reactor, and the second reactor operates by nitrifying the liquid and discharging the nitrified liquid to the first reactor, with the first reactor operating in an anoxic reaction phase and decanting supernatant as the discharged effluent.

2. The system for sewage treatment of claim 1, wherein the anaerobic and anoxic processes utilize a sulphur composition comprising at least one of sulphur and sulphur compounds to transfer electrons from organic carbon to oxygen and to convert phosphorus containing compounds to perform denitrification.

* * * * *